A. L. UNDELAND.
HEAD REST FOR BARBER CHAIRS.
Reissued Mar. 15, 1910. APPLICATION FILED DEC. 30, 1909. 13,094.
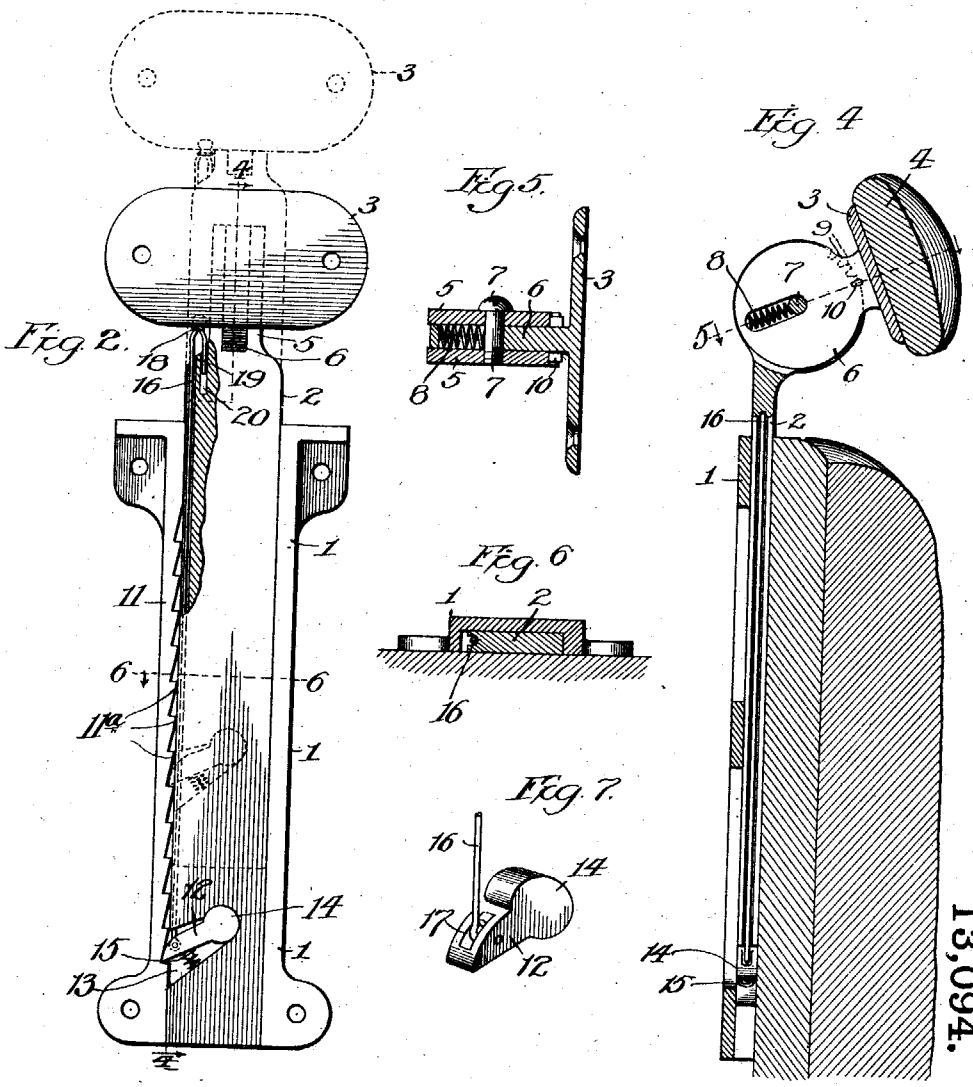
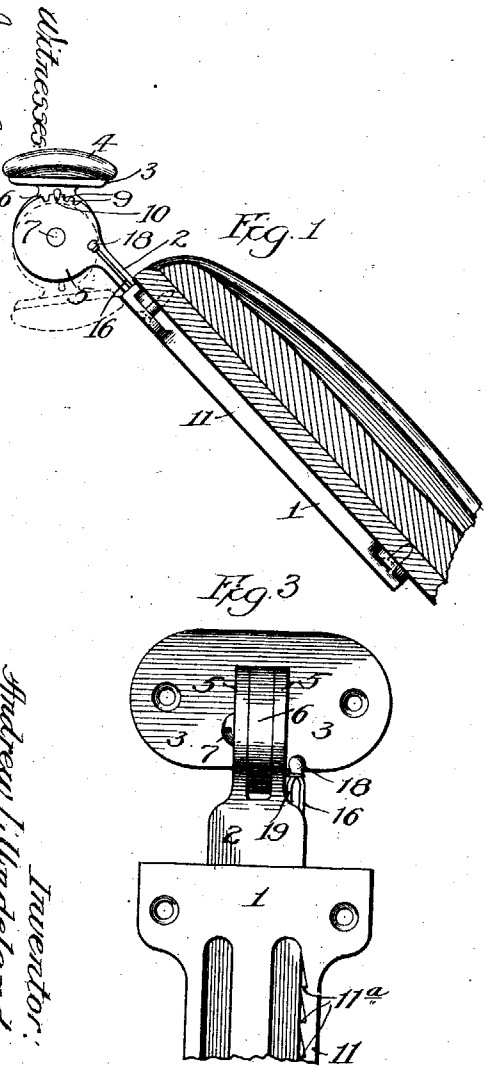
Witnesses
Irving MacDonald
McClelland Young.
Inventor:
Andrew L. Undeland.
By Barton, Banner & Folk,
Attys.
ANDREW B. GRAHAM CO., PHOTO-LITHOGRAPHERS WASHINGTON, D. C.

UNITED STATES PATENT OFFICE.

ANDREW L. UNDELAND, OF OMAHA, NEBRASKA.

HEAD-REST FOR BARBER-CHAIRS.

13,094. Specification of Reissued Letters Patent. Reissued Mar. 15, 1910.

Original No. 942,603, dated December 7, 1909, Serial No. 496,940. Application for reissue filed December 30, 1909. Serial No. 535,693.

*To all whom it may concern:*

Be it known that I, ANDREW L. UNDELAND, citizen of the United States, residing at Omaha, in the county of Douglas and State of Nebraska, have invented a certain new and useful Improvement in Head-Rests for Barber-Chairs, of which the following is a full, clear, concise, and exact description.

My invention relates to an attachment to chairs of the type used by barbers and dentists. Its object is to provide a head-rest which may be quickly and easily adjusted to different positions.

One feature of my invention contemplates means by which the head-rest may be raised or lowered. This and other features of my invention may be more readily understood by reference to the accompanying drawings, in which—

Figure 1 is a side elevation of the structure embodying my invention, the back of the chair to which it is attached being shown in section; Fig. 2 is a front elevation of the attachment removed from the chair, and showing in dotted and full lines, respectively, different vertical positions to which it may be adjusted; Fig. 3 is a rear elevation of the upper end of the structure shown in Fig. 2; Fig. 4 is a section on the line 4—4 of Fig. 2, but as in Fig. 1 showing the attachment affixed to the back of a chair; Fig. 5 is a section on the line 5—5 of Fig. 4; Fig. 6 is a section on the line 6—6 of Fig. 2; and Fig. 7 is a detailed perspective view of the pawl hereinafter referred to.

Similar numerals of reference are used to designate similar parts wherever shown.

The body portion of the attachment consists of a channel-shaped standard 1 adapted to be secured upon the back of a chair, and a slide bar 2 vertically adjustable relative to said standard in order to raise or lower the cushion supporting plate 3, which is carried upon the upper end of said standard and upon which the cushion or head-rest 4 is mounted. The slide-bar 2 is bifurcated at its upper end, said bifurcated end forming two transversely extending disk-like ears 5, 5. A disk-shaped tongue 6 extends rearwardly from the plate 3 and fits into the groove formed between the ears 5. Said disk-shaped tongue 6 is provided with a radially extending slot, as shown in Figs. 4 and 5. A pin 7 passes through said slot and serves to pivot said tongue to said ears. A coiled spring 8 is interposed in said slot between the pin 7 and the opposite end of the slot, the tension of said spring normally holding said tongue with the inner end of the slot resting against the pin 7, as shown in Fig. 4. The circumference of each of the ears 5, 5, is provided at the front with a plurality of grooves separated by teeth 9. The tongue 6 is provided with a pin 10 which is adapted to lie between said teeth and thus to hold the supporting plate 3 in its adjusted reclining position. It is apparent that in order to adjust the reclining position of the head-rest, it is merely necessary to pull the plate 3 forward against the tension of the spring 8 and thus to shift the pin 10 with reference to the teeth 9.

When the use of a head-rest is not desired, as for example, during the operation of cutting hair, the cushion 4 may be pulled forward against the tension of the spring 8, and then swung backward out of the way, as illustrated in dotted lines in Fig. 1. The advantage of such structure over that in common use, which latter structure necessitates the complete removal of the head-rest from the chair when it is not desirable to use the same, is obvious.

One of the side walls of the channel-shaped standard 1 is in the form of a ratch or rack-bar 11 provided with inclined angular teeth $11^a$, between which a pawl 12, carried by the slide-bar 2, drops, thus holding the slide-bar in its adjusted longitudinal position. Near its lower end the slide-bar 2 has a notched cut away portion 13, which is of circular shape at its inner end, and which flares outwardly to one edge of the bar. The pawl 12 has a circular or disk-shaped head 14 which fits in the circular portion of the notch 13. The free end of the pawl 12 is normally held by the thrust of a spring 15 in position between the teeth $11^a$ of the rack-bar 11. The pawl 12 is operated by means of a rod 16 which is pivotally connected at 17 with the pawl 12. Said rod lies in a longitudinal groove in the side of the slide-bar 2, and is provided at its upper end with an operating handle 18. The upper end of the rod 16 may be bent downward, as at 19, into a downwardly extending hole 20, and the rod 16 thus be held in position in the groove of the slide-bar. To raise the slide-bar 2, all that is necessary is to grasp the same and pull it upwardly to the desired position, since the pawl in such case rides freely over the teeth 11[a]. To lower the slide bar, said bar is first slightly raised, so as to free the pawl 12 from the tooth 11[a] with which it is in engagement, whereupon the rod 16 may be depressed to push the pawl 12 down out of engagement with the teeth 11[a]. The slide-bar may then be lowered to the desired position, and upon releasing the bar 16, the tension of the spring 15 causes the pawl 12 to engage a tooth 11[a] and hold the parts in their adjusted positions.

It is obvious that the head-rest may be raised or lowered, adjusted to different reclining positions or swung entirely out of the way, and that such manipulations may be performed with one hand of the operator.

I claim:

1. In an attachment for chairs, the combination with the back of a chair, of a channel-shaped standard secured thereto with the back of the chair forming a cover for the channel-opening, said standard having a ratch formed in one of the side walls of the channel, a slide-bar vertically adjustable in said channel, said slide-bar having an outwardly flared cut-away portion at its lower end in the edge thereof adjacent said ratch, a pawl pivoted within said cut-away portion of the slide-bar, a spring normally holding said pawl in engagement with said ratch, and an operating rod extending from said pawl beyond the upper end of said slide bar and provided at its upper end with an operating handle.

2. In an attachment for chairs, the combination with a channel-shaped standard adapted to be secured to the back of a chair, one of the side walls of the channel forming a ratch, a slide-bar consisting of a flat longitudinal plate vertically adjustable in said channel, said slide-bar having a cut-away portion at its lower end in the side thereof adjacent to said ratch, and a longitudinal groove in the side of the slide bar extending from said cut-away portion to the upper end of the slide-bar, a pawl pivoted within the cut-away portion of the slide-bar, and an operating rod secured to said pawl and extending above the end of said slide bar, said rod lying in said groove in the slide-bar and being provided at its free end with an operating handle.

3. In an attachment for chairs, the combination with a channel-shaped standard adapted to be secured to the back of a chair, one of the side walls of the channel forming a ratch, a slide-bar vertically adjustable in said channel, said slide-bar having a cut-away portion on the side thereof adjacent to said ratch, said cut-away portion being in the form of a deep notch having a rounded bottom and outwardly flaring walls; a pawl pivoted within said cut-away portion of the slide-bar, said pawl having a rounded head fitting in the rounded bottom of said notch, a spring normally holding said pawl in engagement with said ratch, and an operating rod extending from said pawl to the upper end of said slide-bar.

4. In an attachment for chairs, the combination with a channel-shaped standard adapted to be secured to the back of a chair, one of the side walls of the channel forming a ratch, a slide-bar vertically adjustable in said channel, said slide-bar having a cut-away portion on the side thereof adjacent to said ratch, and a longitudinal groove extending from said cut-away portion to the upper end of the slide-bar, a pawl pivoted within the cut-away portion of the slide-bar, and an operating rod lying in said groove in the slide bar, said rod being pivoted at its lower end to said pawl and having its upper end extending beyond said slide-bar and bent back upon itself, said slide bar having a longitudinal hole in its end forming a guide for the end of the bent-back portion of the operating rod.

5. A head rest for chairs, comprising a vertically adjustable slide bar having a bifurcated end, said bifurcated end comprising a pair of disks extending in a plane perpendicular to the plane of said slide bar, said disks being provided upon their circumferences with a plurality of notches, a cushion supporting plate provided at its rear, intermediate the ends thereof, with a perpendicular disk-shaped tongue fitting in the space between said first named pair of disks, a pin extending through the base of said tongue in position to engage with said notches, and means for yieldingly pivoting said tongue centrally with respect to said disks, whereby said cushion supporting plate may be drawn forward to release said pin from said notches and then swung circumferentially about said pair of disks.

6. A head rest for chairs, comprising a vertically adjustable slide bar having a bifurcated upper end, said bifurcated end being in the form of two disk-shaped ears spaced apart to form a groove between the same and provided upon their circumferences with a series of notches, a cushion supporting plate having a disk-shaped tongue projecting from the rear thereof and fitting in said groove, said tongue being provided at its outer end with a slot extending radially from the center thereof, a pin supported at its ends in said ears and extending through said slot, a spring lying in said slot between said pin and the outer end of the slot, the sides of said spring being inclosed by said pair of ears, and a pin extending transversely through the base of said tongue and arranged to engage with said notches to hold said supporting plate in adjusted position with respect to said slide bar.

In witness whereof, I hereunto subscribe my name this 22d day of June A. D., 1908.

ANDREW L. UNDELAND.

Witnesses:

FRANK L. WEAVER,
GEORGE E. FALK.